UNITED STATES PATENT OFFICE.

JAMES DUNKERLEY AND JNO. KNIGHT, OF PATERSON, NEW JERSEY.

IMPROVED COMPOSITION FOR PASTING COPS.

Specification forming part of Letters Patent No. 41,286, dated January 19, 1864.

*To all whom it may concern:*

Be it known that we, JAMES DUNKERLEY and JOHN KNIGHT, both of Paterson, in the county of Passaic and State of New Jersey, have invented a new and Improved Composition for Pasting Cops; and we do hereby declare that the following is a full, clear, and exact description of the same, reference being had to the accompanying diagram, making a part of this specification and intended to illustrate the advantage derived from the use of our composition.

The object of this invention is a composition for fastening the lower ends of cops so that they will not loose their shape or become tangled when removed from the spindle.

Our composition consists in a mixture of tallow, flour, castor-oil and soap, and water, with or without a small quantity of sulphuric acid, and these ingredients are mixed together in about the following proportions: tallow, one ounce; flour, eight ounces; castor-oil and soap, one ounce; water, one gallon. The mixture of castor-oil and soap is prepared by adding two table-spoonfuls of castor-oil to one ounce of soap. To the above-named ingredients ten drops of sulphuric acid may be added, and by this addition the composition will become more limpid and less liable to assume a bad smell than it will without it. The sulphuric acid, however, is not at all indispensable for the success of our composition, and we consider its admixture entirely optional. The tallow and flour, together with the mixture of castor-oil and soap, are boiled in the water for about five minutes, the same as glue, and when cold the paste is ready for use.

This composition is of particular value for fastening the lower ends of cops, and in order to effect this purpose a small quantity of it is applied to the lower ends of the spindles $a$, just above the rail $b$, before the operation of winding on the yarn or thread commences, and if the yarn is now wound on the lower threads are cemented together, and the end of the cop is rendered firm and not liable to get loose or become tangled when taken from the spindles.

What we claim as new, and desire to secure by Letters Patent, is—

A composition produced by mixing the within-described ingredients together, substantially in the manner and about in the proportion herein specified.

JAS. DUNKERLEY.
JOHN KNIGHT.

Witnesses:
JOHN AVISON,
H. M. LOW.